United States Patent Office 3,502,658
Patented Mar. 24, 1970

3,502,658
AMIDINOHYDRAZONES OF 3-KETOSTEROIDS
Kurt W. Ledig, Philadelphia, and Gerhard R. Wendt, Havertown, Pa., assignors to American Home Products Corporation, New York, N.Y., a corporation of Delaware
No Drawing. Filed June 21, 1968, Ser. No. 738,805
Int. Cl. C07c 169/20, 173/10
U.S. Cl. 260—239.5
12 Claims

ABSTRACT OF THE DISCLOSURE

There is described the preparation of various unsaturated 17-hydroxygonane-3-one, amidinohydrazones and salts thereof, as well as the corresponding 17-ethers and esters of those compounds. The compounds have been found useful as antimicrobial agents.

---

The present invention relates to steroidal amidinohydrazones and more particularly is concerned with 3-amidinohydrazones of 17-hydroxygonenes and derivatives thereof.

The compounds of the invention fall within the scope of, and may be illustrated by the following graphical formula:

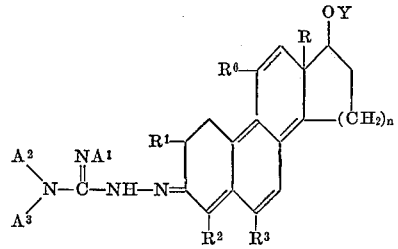

wherein R is (lower)alkyl; $R^1$ is hydrogen or methyl; $R^2$ is hydrogen, methyl, chlorine, bromine, or fluorine; $R^3$ is hydrogen or methyl; $R^6$ is hydrogen or hydroxy; Y is hydrogen, (lower)alkyl, alkanoyl, cyclopentylalkanoyl, methoxy(lower)alkyl, aroyl, nicotinyl, adamantoyl, or carboxy(lower)alkanoyl; $n$ is one or two; $A^1$ and $A^2$ separately represent hydrogen or (lower)alkyl; or taken together form an imidazoline ring; and $A^3$ is hydrogen, nitro, (lower)alkyl, di(lower)alkylamino(lower)alkyl, hexamethyleneimino(lower)alkyl, heptamethyleneimino(lower)alkyl, or octamethyleneimino(lower)alkyl.

The structural formula indicates that while the A-ring always has a double bond in the 4-position, the dotted lines are intended to represent saturation or unsaturation at the positions shown; although no more than three of the positions in the steroid may be unsaturated for any compound of the invention.

Reverting to the various symbols in the above-structural formula, the term "(lower)alkyl" whether alone or having a substituent itself is intended to mean straight or branched-chain alkyls of 1 to 8 carbon atoms. Thus, in the context used here, the term "lower" is intended to means a radical having no more than 8 carbon atoms unless otherwise specified. The term "aroyl" is intended to means a monocyclic aromatic acyl radical such as benzoyl or phenyl(lower)alkanoyl of 8 to 9 carbon atoms in which the phenyl ring is unsubstituted or mono-chloro-substituted. The term "alkanoyl" is intended to mean radicals of 1 to about 20 carbon atoms in straight or branched-chain configuration.

In the preparation of the compounds of the invention, they may be obtained by a reaction as shown hereinbelow:

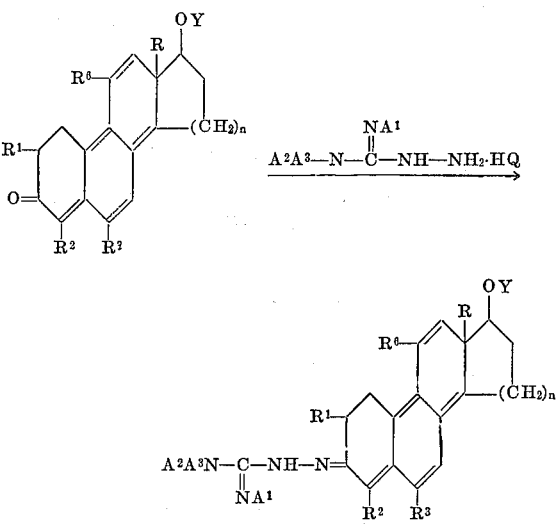

In this reaction as shown more or less schematically, the symbols R, $R^1$, $R^2$, $R^3$, $R^6$, $A^1$, $A^2$, $A^3$, $n$, and Y are intended to have the meanings previously assigned. The symbol "HQ" is intended to represent an organic or inorganic acid, preferably one which will result in the formation of a pharmaceutically acceptable acid-addition salt of the final 3-amidinohydrazone steroidal compound. Preferred acids are those inorganic acids such as nitric, hydrochloric, hydrobromic, sulfuric, phosphoric acids although known organic acids are also acceptable.

The starting materials are known compounds or may be prepared by previously disclosed procedures from known compounds well within the skill of the art. In this respect mention is made of the disclosure of a total synthesis of steroidal substances leading to typical or preferred starting steroids, noting such publications as Douglas et al. and Smith et al. publications, they will be racemate products or designated as in Fieser and Fieser, "Steroids," p. 336 (1959), as "dl-" com- known or may be prepared in the manner disclosed in J. Med. Chem. 6, 283 (1963); J. Org. Chem. 18, 790 (1953) and Bull. Soc. Chim. (France) 561 (1962).

If the starting steroid reactants are derived from a total synthesis such as mentioned above, or as described in the Douglas et al. and Smith et al. publications, they will be racemate products or designated as in Fieser and Fieser, "Steroids," p. 336 (1959), as "dl-" compounds, composed of a mixture of d- form and the corresponding enanthiomorph designated as the l- form. Where no designation is given, it should be understood that the natural form (d) is intended. If one wishes to use as the steroid reactant a resolved d- or l- type of starting steroid, this may be accomplished by known resolution procedures, such as disclosed, for example, in Canadian Patent No. 778,364, issued Feb. 13, 1968, or in the publications of Rufer et al., Liebigs Ann. Chem., 702, 141 (1967) or Buzby et al., J. Med. Chem., 10 199 (1967).

If the starting steroids are the 17-ols and the corresponding esters are desired but not available, they may be produced from the corresponding 17-ols by reaction with the selected acid anhydride at about room temperature until reaction is completed, generally in 15 to 20 hours, preferably using pyridine as a solvent. Alternatively, the acylating agent may be the desired acyl halide, for example, acetyl chloride if the acetate radical is desired in the 17-position. In this type of esterification, the reaction is carried out at about −20 to −10° C. for 15 to 20 hours when reaction is completed.

Starting steroidal 17-ethers are produced from the corresponding steroidal 17-ols by first adding to the 17-hydroxy steroid, sodium hydride (50% in oil) in a benzenoid solvent. The mixture is heated for a few hours and then the desired aliphatic halide is added, reaction to the 17-ether taking place at reflux. If, for example, the 17-ethoxy steroids were desired, the halide reactant could be ethyl bromide, chloride, or iodide and the reaction would be completed in 10 to 20 hours.

An important aspect of the invention is in using the resolved *l*-form of steroidal starting materials. These substances have been shown to have little or no hormonal activity and in forming the amidinohydrazones therefrom a special use is imparted to what could otherwise be considered hormonally useless substances. However, regardless of the fact that the *l*-steroids are hormonally inactive, this carries an important quality that suits the *l*-steroidal nucleus particularly, and even the *dl*-racemates.

It is recognized that steroidal compounds are present in plant and animal cells, and particularly those cells having a nucleus. A number of theories have been advanced as to the mode of action of steroidal compounds among which is the thought suggested here that steroids enhance the rate of transport across cell or plasma membranes. Thus, the steroidal amidinohydrazones of the invention are believed to act and affect microorganisms in a way which has not been observed with either the corresponding aminoguanidines or the steroids by themselves.

Another important advantage that should be mentioned, particularly with respect to estrene nuclei carrying an imidinohydrazone radical is that estrogenic steroids whether the natural or *dl*-forms when given orally or parenterally have been found to be more highly concentrated in the uterus and vagina than in any other portion of the animal body. Thus, if certain aminoguanides possess antimicrobial action, for example, trichomonicidal activity, if these compounds are made a part of the estrogenic nucleus, the drug would conceivably concentrate precisely where it would be most effective as a trichomonicidal agent. More than this, since hormonal activity is not required in this instance but in many cases undesirable, the use of *dl*-steroidal aminohydrazones, and better yet, the *l*-steroidal amidinohydrazones, would be considerably more desirable than the *d*-forms. On the other hand, where particular antimicrobial activity coupled with hormonal action was not detrimental but conceivably desirable, the *d*-steroidal amidinohydrazones would be usefully effective agents.

The novel amidinohydrazones are prepared by the reaction of the selected steroid and the aminoguanidine or salt thereof by reacting equal parts by weight of the two compounds in an inert solvent preferably a lower alkanol such as methanol. The reaction mixture is acidified to a pH in the range of 1 to 3 with a dilute acid, preferably using the same acid as that of the aminoguanidine acid-addition salt. The mixture is stirred for a number of hours and in general, reaction is complete in 6 to 24 hours. The desired product is then isolated, generally by filtration.

The compounds of the invention have been found to be active antimicrobial agents, particularly as antiprotozoan (for example, trichomonas) and amebicidal agents, with lesser but nevertheless observable activity in tests for antibacterial action.

In determining the extent of antimicrobial utility of the compounds, known standard and scientifically acceptable procedures may be used. Thus, the following is a specific example of one assay technic for determining trichomonacidal activity.

A 12.5 mg. portion of test material is added to 2.5 ml. of 1% phosphate buffer, pH 6. Further two-fold dilutions are made in the same buffer. A 1 ml. volume of each dilution is transferred to small sterile screw cap assay tubes containing 3.8 ml. of diamond medium and 0.1 ml. of calf serum. Each assay tube is inoculated with 0.1 ml. of a 48 to 72 hour culture of Trichomonas vaginalis strain ATCC No. 13972. A control assay tube containing no test material is similarly inoculated. The assay tubes are gently shaken and then incubated for 48 hours at 30° C. Following incubation the tubes are gently shaken and a drop is deposited on an eosinophil counting chamber. The chamber is examined by phase contrast microscopy. The number of organisms present in 1 mm.$^2$ is multiplied by 5000 in order to express the count per ml. The difference in the number of organisms present in the control tube and in the tubes containing the test material represents the relative potency of the test material and is expressed as the percentage kill at the specific dose level.

As a typical test for determining antibacterial activity, a stock solution at a suitable dilute concentration in a vehicle is made up, for example, at 10,000 micrograms/ml. This may be diluted two-fold with water and 1 ml. of each dilution is incorporated in agar dishes. The hardened surface is then inoculated with standard test organisms, for example, *B. subtilis*, *S. aureus*, *E. coli*, etc., and incubated 18 hours at 35° C. The minimal inhibitory concentration expressed in $\mu$g./ml., that completely inhibits the test organism is the end-point and determines the minimum amount needed to protect.

To determine the utility of a compound as an amebicidal agent a satisfactory procedure is disclosed by Thompson et al., "Antibiotics and Chemotherapy" 6 (1956), pp. 337–350 and indicates the minimal inhibitory concentration that completely inhibits the particular ameba test organism.

The in vitro tests described above are taken as an acceptable procedure for obtaining the dosage of active substances needed to provide protection against the particular microorganism involved. With respect to the compounds of the invention, the utility as trichomonacidal or amebicial agents has been found in the antimicrobial range of 10 to 100 $\mu$g./ml., aqueous media, with generally good effects noted at 50 to 100 $\mu$g./ml. With respect to the antibacterial activity this, of course, depends on the particular organism to be inhibited or destroyed and a generalized inhibitory range would not have any significant meaning. It may be said, however, that when the test organism was *B. subtilis*, bacteriocidal action was effective below 250 $\mu$g./ml. and generally from 10 to 100 $\mu$g./ml. in an aqueous medium. Again, when the test organism was *Staphylococcus aureus*, bacteriocidal action was found at 15.6 $\mu$g./ml., and higher, up to 250 $\mu$g./ml.

The compounds are deemed particularly useful in cleansing compositions having bacteriocidal action, for topical application, for example, for food handlers who might be amebae carriers. They are also useful generally in decontaminating solutions for animal premises. As a trichomonicide, the compounds may be used topically in aqueous compositions for the treatment of cattle infected with trichomonas organisms.

The compounds of the invention may be used either in the form of bases or as acid-addition salts that are pharmaceutically acceptable and nontoxic under the conditions of use. As prepared, they are isolated as salts of the same type as the aminoguanidine salt used. If the base is desired, one may merely convert the salt with an alkali in known manner. If a different salt is desired, once the base is obtained, then it can be reacted with the selected organic or inorganic acid to yield the corresponding salt.

Compositions of the active substance or substances may be made up for typical formulations depending on the end use, whether as an oral composition or for topical use. Aqueous or nonaqueous vehicles, well known in the art may be used as well as the usual carriers, diluents and excipients. The active ingredients in such compositions could be present in an amount within the range indicated above, with the larger amount preferred where topical compositions were involved.

The following examples will illustrate the preparation

EXAMPLE 1

*dl*-13-ethyl-17β-hydroxygon-4-en-3-one, amidinohydrazone, nitrate salt

To a solution of 5.0 g. of aminoguanidine nitrate in 175 ml. methanol was added 5.0 g. of *dl*-13-ethyl-17β-hydroxygon-4-en-3-one. After the addition of 2 ml. 7% nitric acid, the reaction mixture was left standing overnight at room temperature. Refrigeration at +5° over a period of 48 hours afforded 5.3 g. of the title compound; M.P. 253°. Found: C, 58.73; H, 8.12; N, 17.24. $C_{20}H_{32}N_4O \cdot HNO_3$ requires: C, 58.94; H, 8.16; N, 17.19.

EXAMPLE 2

*d*-17β-hydroxyestr-4-en-3-one, amidinohydrazone, nitrate salt

A hot solution of 1.0 g. of aminoguanidine nitrate and 25 ml. of methanol was treated with 1.0 g. of 19-nortestosterone. The reaction mixture was adjusted to pH 2.5 and stirred overnight at approximately 37°. The precipitate was filtered and washed with methanol to give 1.0 g. of the title compound; M.P. 258–259° dec.;

$$\lambda_{max}^{KBr}\ 3.23;\ 5.90;\ 6.00;\ 6.21\mu$$

Found: C, 57.82; H, 7.79; N, 17.6. $C_{19}H_{30}N_4O \cdot HNO_3$ requires: C, 57.99; H, 7.94; N, 17.80%.

EXAMPLE 3

*dl*-17β-hydroxyestra-4,8(14)-dien-3-one, amidinohydrazone, nitrate salt

To a solution of 500 mg. of aminoguanidine nitrate in 10 ml. of methanol was added 500 mg. of *dl*-17β-hydroxyestra-4,8(14)-dien-3-one and 1 ml. of nitric acid (7%). The reaction mixture was stirred for 20 hours After evaporating to one-half of its volume, 700 mg. of the title compound precipitated; M.P. 211–212° dec. Found: C, 57.05; H, 7.52; N, 17.59. $C_{19}H_{28}N_4O \cdot HNO_3 \cdot \tfrac{1}{2}H_2O$ requires: C, 56.98; H, 7.55; N, 17.49.

EXAMPLE 4

*dl*-17β-hydroxyestra-4,8(14),9-trien-3-one, amidinohydrazone, nitrate salt

A solution of 5.5 g. of *dl*-17-hydroxyestra-5(10),8(14)-dien-3-one in 76 ml. pyridine at 5° was treated with 6.9 g. of pyridinium bromide perbromide. After 5 minutes the reaction mixture was diluted with ice water and the resulting precipitate filtered. The crude dibromide thus obtained was dissolved in 400 ml. of pyridine; after two hours the reaction mixture was diluted with water and extracted with methylene chloride. The material was crystallized from ether, yielding the compound, *dl*-17β-hydroxyestra-48(14),9-trien-3-one; M.P. 144–145°; $\lambda_{max}$ 354 mμ ($\epsilon$ 22,400).

Reacting a solution of 1.0 g. of aminoguanidine nitrate in 25 ml. of methanol with 1.0 g. of the triene steroid, adjusted to a pH of about 2 with nitric acid, and held at room temperature overnight will produce the title compound.

*l*-13-ethyl-17β-hydroxygon-4-en-3-one.
*d*-17β-hydroxyestra-4,9-dien-3-one.
*l*-17β-hydroxyestra-4,8(14)-dien-3-one.
*l*-17β-hydroxyestr-4-en-3-one.
*l*-17β-hydroxyestra-4,8(14),9-trien-3-one.
4-methyl-19-nortestosterone.
*dl*-17β-hydroxyestra-4,6,8(14)-trien-3-one.
17β-hydroxy-2α-methylestr-4-en-3-one and
17β-hydroxy-2β-methylestr-4-en-3-one.
*dl*-17a,β-hydroxy-13-methyl-D-homogona-4,9-dien-3-one.
*dl*-13-ethyl-17a,β-hydroxy-D-homogona-4,9-dien-3-one.
*d*-13-ethyl-17β-hydroxygon-4-en-3-one.
*l*-13-ethyl-17a,β-hydroxy-D-homogona-4,9-dien-3-one.
*dl*-13-ethyl-17β-hydroxy-6α-methylgon-4-en-3-one.
*dl*-13-ethyl-17a,β-hydroxy-D-homogon-4-en-3-one.
*dl*-13-ethyl-11α,17β-dihydroxyestr-4-en-3-one.
*dl*-17β-hydroxy-13-propylgon-4-en-3-one.
*dl*-17β-hydroxy-13-propylgona-4,9-dien-3-one.
*dl*-17a,β-hydroxy-13-propyl-D-homogon-4-en-3-one.
*dl*-17β-hydroxy-13-isopropylgon-4-en-3one.
*dl*-13-butyl-17β-hydroxygona-4,9-dien-3-one.
*l*-17β-hydroxy-13-propylgon-4-en-3-one.
*l*-17β-hydroxy-13-butylgon-4-en-3-one.
*l*-17β-hydroxy-13-propylgona-4,9-dien-3-one.

The compounds formed in using these substances would obviously be the corresponding amidinohydrazones. Also, instead of using aminoguanidine acid-addition salt as illustrated in the examples, it should be pointed out that other known or available aminoguanidines are contemplated, represented by and falling within the formula:

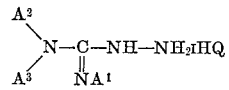

as given and described above. Thus, particular mention is made of such desirable amino reactants as 3-amino-1,1-dimethylguanidine, 3-amino-1,2-dimethylguanidine, 3-amino-1-ethylguanidine, 3-amino-1-nitroguanidine, 3-amino-1-(2-dimethylaminoethyl) guanidine, 3-amino-1-(3-diethylaminopropyl) guanidine, 3-amino-1-[2-(butylmethylamino)ethyl] guanidine, 3-amino-1-(2-hexamethyleneiminoethyl) guanidine, 3-amino-1-(2-octamethyleneiminoethyl) guanidine, 3-amino-1,2-ethyleneguanidine.

EXAMPLE 5

*d*-17β-(2-hydroxyethoxy)-estr-4-en-3-one, amidinohydrazone, nitrate salt

To a hot solution of 1.0 g. of aminoguanidine nitrate in 30 ml. of methanol was added 1.0 g. of *d*-17β-(2-hydroxyethoxy)-estr-4-en-3-one. The reaction mixture was adjusted to pH 3 with 7% nitric acid to obtain after evaporation to a small volume 700 mg. of the title compound; M.P. 203–204°; Found: C, 57.22; H, 8.09; N, 16.17. $C_{21}H_{34}N_4O_2 \cdot HNO_3$ requires: C, 57.64; H, 8.06; N, 16.01%.

EXAMPLE 6

*dl*-17β-ethoxy-13-ethylgon-4-en-3-one, amidinohydrazone, nitrate salt

To a solution of 500 mg. of aminoguanidine nitrate in 30 ml. of methanol was added 500 mg. of *dl*-17β-ethoxy-13-ethylgon-4-en-3-one followed by 3 ml. of 7% nitric acid. The reaction mixture was stirred overnight and the resulting precipitate filtered to give 400 mg. of the title compound; M.P. 240–242°; Found: C, 60.68; H, 8.78; N, 16.34. $C_{22}H_{36}N_4O \cdot HNO_3$ requires: C, 60.66; H, 8.56; N, 16.08.

In place of 17-β-ethoxy-gon-4-en-3-one of Example 6, the same procedure is followed using one of the 17-ether steroids given below:

17β-methoxyestr-4-en-3-one.
*dl*-13-ethyl-17β-methoxygon-4-en-3-one.
*d*-17β-(2-methoxyethoxy)estr-4-en-3-one.
*d*-17β-ethoxyestr-4-en-3-one.
*dl*-13-ethyl-17β-propoxygon-4-en-3-one.
*d*-17β-propoxyestr-4-en-3-one.
*d*-17β-butoxyestr-4-en-3-one.
*d*-17β-amyloxyestr-4-en-3-one.
*d*-17β-allyloxyestr-4-en-3-one.
*d*-17β-(2-fluoroethoxy)estr-4-en-3-one.

The *l* form of the 17-ether steroidal amidinohydrazones are prepared by first resolving the *dl*-17-hydroxy-3-one steroids and then forming the *l*-17-ether steroids by well-known procedures. Once the latter are obtained, they may be reacted with a selected aminoguanidine as described

EXAMPLE 7 dl-13-ethyl-17β-hydroxygon-4-en-3-one, amidinohydrazone, (β-cyclopentyl) propionate, nitrate salt To a solution of 500 mg. of amidinoguanidine nitrate in 10 ml. of methanol was added 500 mg. of dl-13-ethyl-17β-hydroxygon-4-en-3-one, β-cyclopentylpropionate and 1 ml. of 7% nitric acid. The clear solution was stirred overnight at room temperature and the resulting precipitate filtered to give 550 mg. of title compound; M.P. 202° dec. Found: C, 63.18; H, 8.48; N, 13.21. $C_{28}H_{44}O_2N_2 \cdot HNO_3$ requires: C, 63.24; H, 8.53; N, 13.17.

EXAMPLE 8 l-13-ethyl-17β-hydroxygon-4-en-3-one, amidinohydrazone, decanoate, nitrate salt

To a solution of 700 mg. of l-13-ethyl-17β-hydroxygon-4-en-3-one, decanoate was added 700 mg. of aminoguanidine nitrate. The clear solution obtained on heating was cooled to room temperature, and after addition of 0.7 ml. 7% nitric acid the reaction mixture was stirred for 6 hours. The resulting precipitate was filtered to yield 600 mg. of the title compound; M.P. 177° dec. Found: C, 64.04; H, 9.10; N, 12.45. $C_{30}H_{50}N_4O_2 \cdot HNO_3$ requires: C, 64.13; H, 9.15; N, 12.46.

EXAMPLE 9 dl-13-ethyl-17β-hydroxygon-4-en-3-one, nicotinate, amidinohydrazone, dinitrate salt To a solution of 400 mg. of aminoguanidine nitrate and 6 ml. of methanol was added 400 mg. of dl-ethyl-17β-hydroxygon-4-en-3-one, nicotinate and 1 ml. of 7% nitric acid. The reaction mixture was stirred for 5 hours and the resulting precipitate filtered to give 500 mg. of the title compound; M.P. 181° dec. Found: C, 53.33; H, 6.29; N, 16.70. $C_{26}H_{35}N_5O_2 \cdot \frac{1}{2}H_2O$ requires: C, 53.41; H, 6.55; N, 16.77.

In the preparation of other amidinohydrazone-17-esters, the procedure of Examples 7 or 8 is followed, replacing the starting steroids of these examples with anyone of the following compounds:

dl-19-nortestosterone acetate.
l-19-nortestosterone acetate.
4-methyl-19-nortestosterone, acetate.
4-chloro-19-nortestosterone, acetate.
4-chloro-19-nortestosterone, β-cyclopentylpropionate.
17β-hydroxyestra-4,9,11-trien-3-one, acetate.
17β-hydroxyestra-4,9,11-trien-3-one, benzoate.
17β-hydroxy-4,9,11-trien-3-one, trimethylacetate.
17β-hydroxyestra-4,9,11-trien-3-one, trimethylacetate.
17β-hydroxyestra-4,9,11-trien-3-one, cyclopentylacetate.
13-ethyl-17β-hydroxygona-4,9,11-trien-3-one, acetate.
13-ethyl-17β-hydroxygona-4,9,11-trien-3-one, benzoate.
13-ethyl-17β-hydroxygona-4,9,11-trien-3-one, phenylacetate.
17β-hydroxy-13-propylgona-4,9,11-trien-3-one, acetate.
17β-hydroxy-13-propylgona-4,9,11-trien-3-one, trimethylacetate.
17β-hydroxy-13-propylgona-4,9,11-trien-3-one, benzoate.
17β-hydroxy-13-propylgona-4,9,11-trien-3-one, phenylacetate.
4-chloro-19-nortestosterone, benzoate.
4-chloro-19-nortestosterone, phenylacetate.
4-chloro-19-nortestosterone, p-chlorophenoxyacetate.
4-fluoro-19-nortestosterone, acetate.
4-bromo-19-nortestosterone, benzoate.
4-chloro-17β-hydroxyestra-4,9,11-trien-3-one, acetate.
dl-13-ethyl-17β-hydroxygon-4-en-3-one, phenylacetate.
dl-ethyl-17β-hydroxygon-4-en-3-one, isovalerate.
dl-13-ethyl-17β-hydroxygon-4,9-dien-3-one, β-phenylpropionate.
l-13-ethyl-17β-hydroxygon-4-en-3-one, β-cyclopentyl propionate.
dl-13-ethyl-17β-hydroxygon-4-en-3-one, Δ¹⁰-undecenoate.
dl-13-ethyl-17β-hydroxygon-4-en-3-one, hemisuccinate.
dl-13-ethyl-17β-hydroxygon-4-en-3-one, benzoate.
l-13-ethyl-17β-hydroxygon-4-en-3-one, hemisuccinate.
l-13-ethyl-17β-hydroxygon-4-en-3-one, benzoate.
dl-17β-hydroxyestra-4,9-dien-3-one, β-phenylpropionate.
dl-13-ethyl-17β-hydroxygon-4-en-3-one, acetate.
d-17β-hydroxyestr-4-en-3-one, eicosanoate.
dl-13-ethyl-17β-hydroxygon-4-en-3-one, eicosanoate.
d-17β-hydroxyestra-4,9-dien-3-one, 17-benzoate.
dl-13-ethyl-17a,β-hydoxy-D-homogon-4-en-3-one, decanoate.
dl-13-ethyl-17β-hydroxygona-4,6-dien-3-one, acetate.
dl-13-ethyl-17β-hydroxygon-4-en-3-one, 1-adamantanecarboxylate.
dl-13-ethyl-17β-hydroxygon-4-en-3-one, propionate.
dl-13-ethyl-17β-hydroxygona-4,9-dien-3-one, acetate.
dl-13-ethyl-17a,β-hydoxy-D-homogon-4-en-3-one, β-phenylpropionate.
dl-17β-hydroxy-13-propylgon-4-en-3-one, β-phenylpropionate.
dl-17β-hydroxy-13-propylgon-4-en-3-one, benzoate.
dl-17a,β-hydroxy-13-propyl-D-homogon-4-en-3-one, β-phenylpropionate.
dl-17a,β-hydroxy-13-propyl-D-homogon-4-en-3-one, decanoate.
l-17a,β-hydroxy-13-propyl-D-homogon-4-en-3-one, decanoate.
dl-17β-hydroxy-13-isobutylgon-4-en-3-one, β-phenylpropionate.

Obviously, any of the aminoguanidines previously mentioned broadly or specifically may be employed in suitable salt form in place of the unsubstituted aminoguanidine nitrate utilized in the various examples for illustrative purposes.

As previously described with respect to the preparation of l-type of steroidal-17-ethers, a preferred method for making l-type of 17-ester steroidal amidinohydrazones is to first resolve the selected dl-17β-hydroxy-3-one racemate into the d- and l-forms, prepare the ester of each by known or described procedures, and then react the latter with the selected aminoguanidine as indicated by the illustrative examples.

The invention claimed is:

1. A compound having the structural formula:

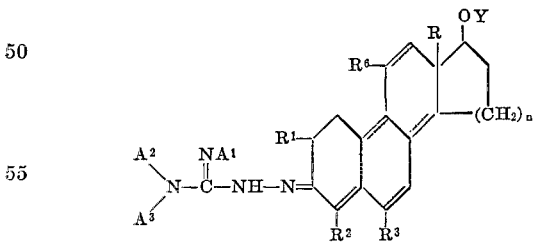

wherein $R^1$ is hydrogen or methyl;
$R^2$ is hydrogen, methyl, chlorine, bromine, or fluorine;
$R^3$ is hydrogen or methyl;
$R^6$ is hydrogen;
Y is hydrogen, (lower)alkyl, alkanoyl of 1 to 20 carbon atoms, hydroxy(lower)alkyl, aroyl of 7 to 9 carbon atoms, nicotinyl, adamantoyl, or carboxy(lower)alkanoyl of 3 to 4 carbon atoms;
n is one or two;
$A^1$ and $A^2$ separately represent hydrogen or (lower) alkyl; or taken together form an imidazoline ring; and
$A^3$ is hydrogen, nitro, (lower)alkyl, di(lower)alkylamino(lower)alkyl, hexamethyleneimino(lower)alkyl, heptamethyleneimino(lower)alkyl, or octamethyleneimino(lower)alkyl;

the dotted lines representing a saturated or unsaturated linkage; with the proviso that no more than three double bonds are present in the tetracyclic structure; that when one of R¹, R², or R³ is other than hydrogen, the other two are hydrogen; that when $n$ is two, R¹, R², and R³ are hydrogen; and pharmaceutically acceptable acid-addition salts of said compounds.

2. A compound of claim 1; in which A¹, A², A³ are each hydrogen.

3. Compound is racemate form represented by the formula:

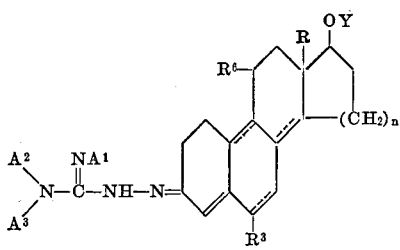

in which

R is a lower alkyl of 1 to 4 carbon atoms;
R³ is hydrogen;
R⁶ is hydrogen;
$n$ is one or two;
Y is hydrogen, alkyl of 1 to 3 carbon atoms, alkanoyl of 1 to 20 carbon atoms, undecenoly, hydroxyethyl, cyclopentylpropionyl, benzoyl, phenyl(lower)alkanoyl of 8 to 9 carbon atoms, nicotinyl, adamantoyl, or carboxypropionyl.
A¹ and A² separately represent hydrogen, an alkyl of 1 to 2 carbon atoms or taken together form an imidazoline ring; and
A³ is hydrogen, nitro, alkyl of 1 to 2 carbon atoms, di(lower)alkylamino(lower)alkyl in which the alkyls each have no more than 4 carbon atoms, hexamethyleneiminoethyl or octamethyleneiminoethyl;

the dotted lines indicating a single or double bond, with the proviso, however, that not more than 3 double bonds are present in any compound; and the pharmaceutically acceptable acid-addition salts thereof.

4. A compound of claim 3; in which A¹, A², and A³ are each hydrogen.

5. As a compound of claim 3; $dl$-13-ethyl-17β-hydroxy-gon-4-en-3-one, amidinohydrazone, nitrate salt.

6. As a compound of claim 3; $dl$-13-ethyl-17β-hydroxy gon-4-en-3-one,amidinohydrazone, nitrate salt.

7. As a compound of claim 3; $dl$-17β-ethoxy-13-ethyl-gon-4-en-3-one, amidinohydrazone, nitrate salt.

8. As a compound of claim 3; $dl$-13-ethyl-17β-hydroxy-gon-4-en-3-one, amidinohydrazone, (g-cyclopentyl) propionate, nitrate salt.

9. As a compound of claim 3; $dl$-13-ethyl-17β-hydroxy-gon-4-3-one, nicotinate, amidinohydrazone, dinitrate salt.

10. An optically active $l$-compound of the formula:

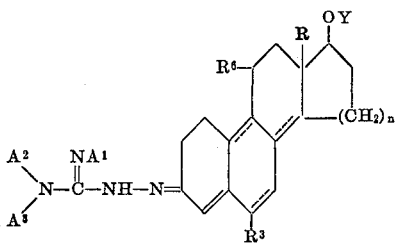

in which:

R is a lower alkyl of 1 to 4 carbon atoms;
R³ is hydrogen;
R⁶ is hydrogen;
$n$ is one or two;
Y is hydrogen, alkyl of 1 to 3 carbon atoms, alkanoyl of 1 to 20 carbon atoms, undecenoyl, hydroxyethyl, cyclopentylpropionyl, benzoyl, phenyl(lower)alkanoyl of 8 to 9 carbon atoms, nicotinyl, adamantoyl, or carboxypropionyl;
A¹ and A² separately represent hydrogen, an alkyl of 1 to 2 carbon atoms or taken together form an imidazoline ring; and
A³ is hydrogen, nitro, alkyl of 1 to 2 carbon atoms, di(lower)alkylamino(lower)alkyl in which the alkyls each have no more than 4 carbon atoms, hexamethyleneiminoethyl or octamethyleneiminoethyl;

the dotted lines indicating a single or double bond, with the proviso, however, that no more than 3 double bonds are present in any compound; and the pharmaceutically acceptable acid-addition salts thereof.

11. A compound of claim 10; in which A¹, A², and A³ each stands for hydrogen.

12. As a compound of claim 10; $l$-13-ethyl-17β-hydroxy-4-en-3-one, amidinohydrazone, decanoate, nitrate salt.

References Cited

UNITED STATES PATENTS 3,069,414   12/1962   de Ruggieri _____ 260—239.5
3,251,863   5/1966    Schuetz et al. _____ 260—397

OTHER REFERENCES

Pesez et al., Bull. Soc. Chim., France (1958), pp. 488–489.

HENRY A. FRENCH, Primary Examiner

U.S. Cl. X.R.

260—309.6, 397.5, 468, 617, 999

PO-1050
(5/69)

UNITED STATES PATENT OFFICE
CERTIFICATE OF CORRECTION

Patent No. 3,502,658                    Dated March 24, 1970

Inventor(s) Kurt W. Ledig and Gerhard R. Wendt

It is certified that error appears in the above-identified patent and that said Letters Patent are hereby corrected as shown below:

In claim 1, the formula should be as follows:

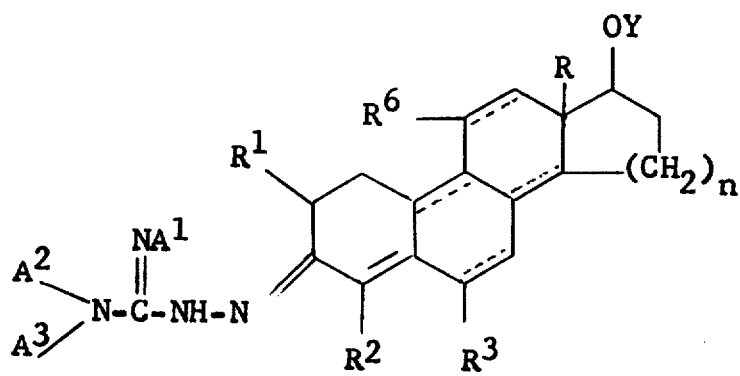

In claim 1, line 59, after the word "wherein" the phrase
- - R is (lower)alkyl; - - should be inserted.

In claim 6, after "claim 3;", the compound should read
- - dl-17β-hydroxyestra-4,8(14)-dien-3-one, amidinohydrazone, nitrate salt. - -

In claim 8, after the word "amidinohydrazone," the phrase "(g-cyclopentyl)" should read - - (β-cyclopentyl) -

In claim 12, after "claim 10;" the 1 should be in italics.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,502,658      Dated March 24, 1970

Inventor(s) Kurt W. Ledig and Gerhard R. Wendt

It is certified that error appears in the above-identified patent and that said Letters Patent are hereby corrected as shown below:

In column 5, line 62, after the word "compound" insert the following paragraph:

- - The procedures described in the above Examples may be followed in preparing corresponding 1- amidinohydrazones or generally other desired amidinohydrazones using aminoguanidine and, for example, the following 17-hydroxygonenes in place of the starting gonenes of the above examples: - -

In column 9, line 29, following "atoms," the word "undecenoly" should read - - undecenoyl - - .

SIGNED AND
SEALED
NOV 3 1970

(SEAL)
Attest:

Edward M. Fletcher, Jr.
Attesting Officer

WILLIAM E. SCHUYLER, JR.
Commissioner of Patents